US008813426B2

(12) United States Patent
Chwala

(10) Patent No.: US 8,813,426 B2
(45) Date of Patent: *Aug. 26, 2014

(54) DUCT ACCESS DOOR

(71) Applicant: Omni Containment Systems, LLC, Elgin, IL (US)

(72) Inventor: Kevin R. Chwala, Barrington, IL (US)

(73) Assignee: Omni Containment Systems, LLC, Elgin, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,227

(22) Filed: Dec. 3, 2013

(65) Prior Publication Data

US 2014/0123561 A1    May 8, 2014

Related U.S. Application Data

(63) Continuation-in-part of application No. 13/670,653, filed on Nov. 7, 2012.

(51) Int. Cl.
E05C 21/02        (2006.01)
(52) U.S. Cl.
USPC .............................................. 49/465; 49/466
(58) Field of Classification Search
USPC ........................................... 49/463, 465, 466
See application file for complete search history.

(56) References Cited

U.S. PATENT DOCUMENTS

| 624,715 A | 5/1899 | Wenz |
|---|---|---|
| 1,287,290 A | 12/1918 | Golden |
| 1,818,269 A | 8/1931 | Olley |
| 2,057,866 A | 10/1936 | Weber |
| 2,073,897 A | 3/1937 | Loetscher |
| 2,576,734 A | 11/1951 | Welker |
| 2,849,764 A | 9/1958 | Rich et al. |
| 2,989,786 A | 6/1961 | Cuss |
| 3,221,616 A | 12/1965 | Flegel |
| 3,241,547 A | 3/1966 | Hirsch |
| 4,106,236 A | 8/1978 | Oliphant |
| 4,913,127 A | 4/1990 | Dugger |
| 4,964,755 A | 10/1990 | Lewis et al. |
| 5,165,189 A | 11/1992 | Besal |
| 5,255,479 A | 10/1993 | Shepherd |
| 5,356,048 A | 10/1994 | Geiser |
| 5,669,190 A | 9/1997 | Szyjkowski |
| 5,901,502 A | 5/1999 | Rafalski et al. |

(Continued)

OTHER PUBLICATIONS

Corresponding Parent U.S. Appl. No. 13/670,653 Office Action dated Jul. 22, 2013.

(Continued)

*Primary Examiner* — Jerry Redman
(74) *Attorney, Agent, or Firm* — Adam K Sacharoff; Much Shelist, PC

(57) ABSTRACT

An access panel for an opening in a duct is provided. The access panel includes an exterior and an interior. The access panel further includes a section positioned on the interior and having a profile substantially corresponding to the opening in the duct. A plurality of fasteners is positioned about the section. Each fastener has a clip configured to move to a position defined to extend away from the profile of the section on the interior. When the access panel is positioned with the section on the interior against the opening in the duct and the fasteners are moved to the locking position the clips rotate to extend over the profile and secure a portion of the duct adjacent to the opening against the interior of the access panel.

16 Claims, 11 Drawing Sheets

(56) References Cited

U.S. PATENT DOCUMENTS

| | | |
|---|---|---|
| 6,363,670 B1 | 4/2002 | Dewitt |
| 6,505,441 B1 | 1/2003 | Shuey et al. |
| 7,305,800 B1 | 12/2007 | Calfee |
| 7,377,072 B2 | 5/2008 | Meier et al. |
| 7,469,502 B1 | 12/2008 | Steel |
| 8,276,319 B2 | 10/2012 | Duffy |
| 2007/0204530 A1 | 9/2007 | Janesky |
| 2008/0115418 A1 | 5/2008 | Duffy |
| 2010/0180509 A1 | 7/2010 | Pridemore et al. |

OTHER PUBLICATIONS

Corresponding Parent U.S. Appl. No. 13/670,653 Notice of Allowance dated Oct. 9, 2013.

DUCT ACCESS DOOR

CROSS REFERENCE TO RELATED APPLICATIONS

The present application is a continuation in part of U.S. application Ser. No. 13/670,653 filed Nov. 7, 2012.

BACKGROUND OF THE INVENTION

The background of the invention relates to a duct access door. Typically to clean or inspect a duct or a portion thereof, a technician cuts a portion of the duct out. After inspecting and/or cleaning the technician would place the cut out portion over the hole and tape it back in place. While this may be solve the current problem there a numerous disadvantages with this approach. First, the technician may not tape the portion back entirely, leaving gaps or spaces between the opening in the duct and the resealing thereof. Second, after a while the tape can begin pealing away from the duct exposure portion of the duct to dust and dirt. Third, in industrial and commercial businesses duct inspection and cleaning occurs more frequent then in residential arrears. To reopen the duct the technician has to cut away the tape and then re-seal, often leaving further issues and problems that are not visual to the technician but may occur afterwards. Forth, cutting away a portion of the duct often leaves sharp corners that can easily cut a technician arms and hands. Fifth, other products on the marks have loose parts such as nuts or bolts that can be easily lost or misplaced, often times left in the duct itself.

There is thus a need to provide an easy and simply solution that provides easy access to the duct, especially for future use.

SUMMARY OF THE INVENTION

One or more of the embodiments provided in the present invention relates to an access panel for an opening in a duct system. The access panel includes a base plate having an exterior surface side and an interior surface side. The base plate when positioned in the opening of the duct system has the interior surface side facing the duct system and the exterior surface side facing away from the duct system. The access panel also includes a section positioned on the interior surface side that has a profile substantially corresponding to the opening in the duct system. In addition, a plurality of rotatable fasteners are positioned about the section. Each fastener has a locking clip configured to move to a locking position defined to extend over the profile of the section on the interior surface side. As such, when the access panel is positioned with the section on the interior surface against the opening in the duct system and the plurality of rotatable fasteners are moved to the locking position the locking clips rotate to extend over the profile and secure a portion of the duct system adjacent to the opening against the interior surface side of the access panel.

In additional aspect of this embodiment, the access panel may include a handle secured to the exterior side. To further help create a better seal between the duct an access panel, a gasket may be positioned on the interior surface side of the base plate, the gasket being further positioned between a terminus end of the interior surface side and the plurality of fasteners. In addition, the access panel may further include a rope seal positioned between the terminus end and outer side of the gasket.

The fasteners may be configured to include (i) a bottom plate secured to the interior surface side of the access panel, (ii) a rotatable cylinder having a front face positioned through the bottom plate and base plate of the access panel such that the front face is accessible from the exterior surface side of the access panel, (iii) a support flange extending from an edge of the bottom plate to a rear face portion defined on the cylinder, and (iv) a locking clip secured to the cylinder and rotatable therewith, the locking clip having a portion that is configured to move into engagement over a portion of the gasket when the cylinder rotates. As such, when the access panel is positioned with the section on the interior surface against the opening in the duct system and the plurality of rotatable fasteners are moved to the locking position the locking clips move into engagement against a portion of the duct system adjacent to the opening to secure the same against a portion of the gasket. The front face of each cylinder may include a key head or a knurl head.

Numerous other advantages and features of the invention will become readily apparent from the following detailed description of the invention and the embodiments thereof, from the claims, and from the accompanying drawings.

DESCRIPTION OF THE DRAWINGS

A fuller understanding of the foregoing may be had by reference to the accompanying drawings, wherein.

DETAILED DESCRIPTION OF THE EMBODIMENTS

Figure 1:
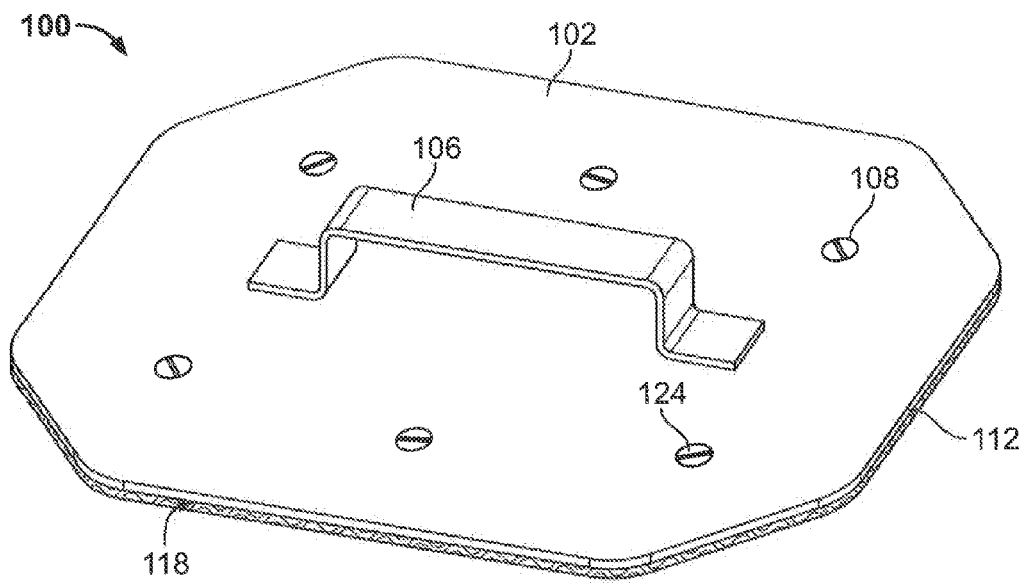
FIG. 1 is a perspective view of an access panel used to secure against an opening in a duct system.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

Figure 2:
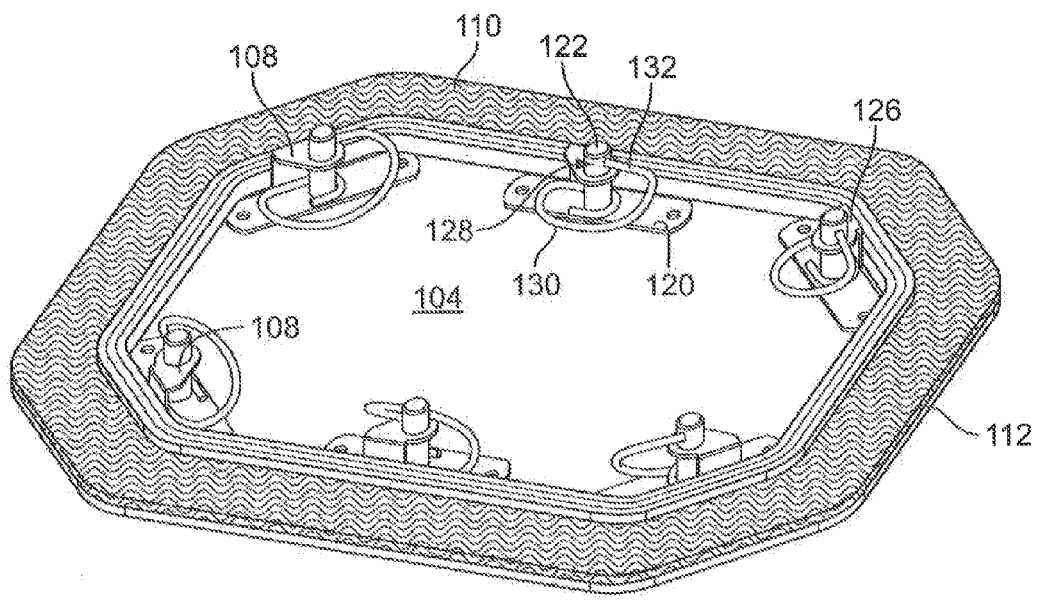
FIG. 2 is a perspective view of an interior side of the access panel from FIG. 1.

Referring now FIGS. 1 and 2 there is provided an access panel 100 for use with in a duct system found in any residential, commercial or industrial areas. The access panel 100 has a base plate with an exterior side 102 and an interior side 104. The interior side 104 would face the duct, while the exterior side 102 would in turn face away from the duct. A handle 106 could be positioned on the exterior side 102 to allow the technician easy means of holding the access panel 100 when installing or removing it from the duct. A plurality of fasteners 108 (or cam locks), explained in greater detail below, are also provided in the access panel 100 and provides a means for securing the access panel 100 to an edge portion of the opening in the duct.

The interior side 104 of the access panel 100 may include a gasket 110 positioned between a terminus end 112 of the interior side 104 and the plurality of fasteners 108. In various aspects of the present invention the gasket 110 may be made from neoprene and act as a dust gasket preventing dust, particles, or gas from inside the duct from escaping.

Figure 3:
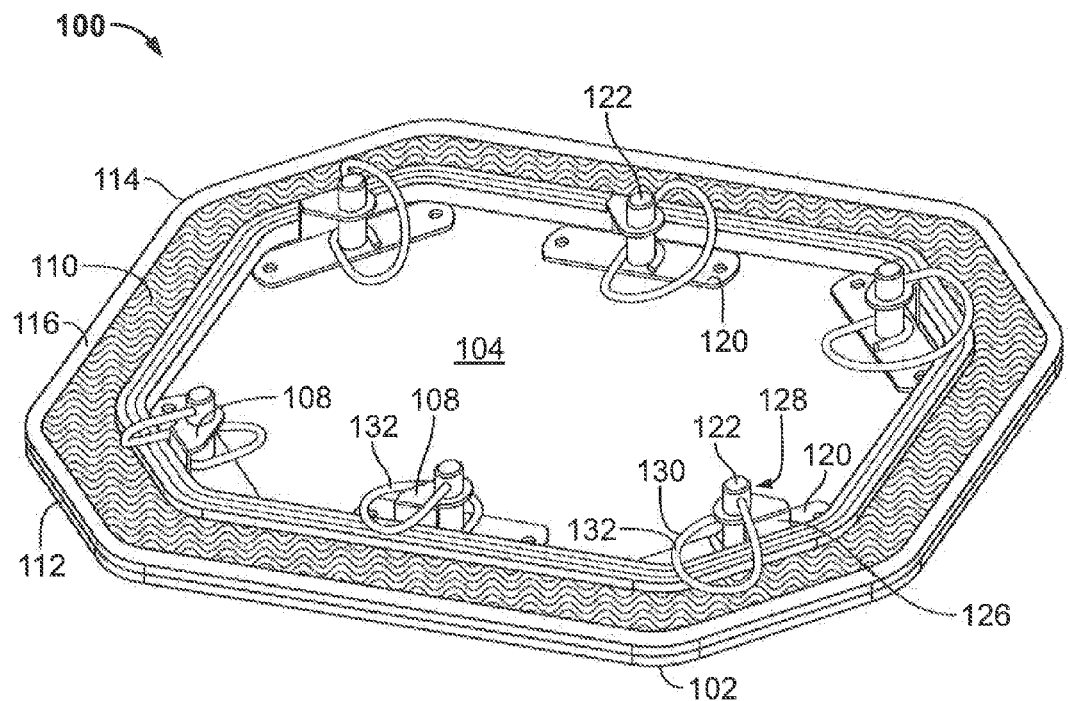
FIG. 3 is a perspective view of an interior side of an access panel in accordance with another embodiment of the invention.
Figure 4:
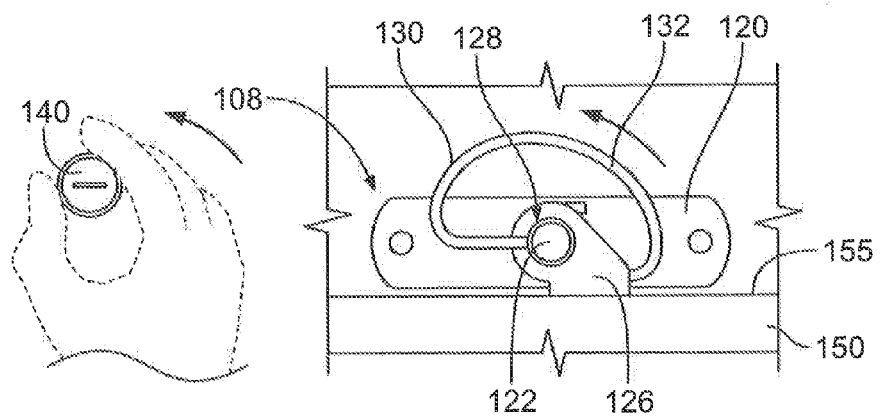
FIG. 4 is a top view of a fastener used to secure the access panel against the duct system.
Figure 5:
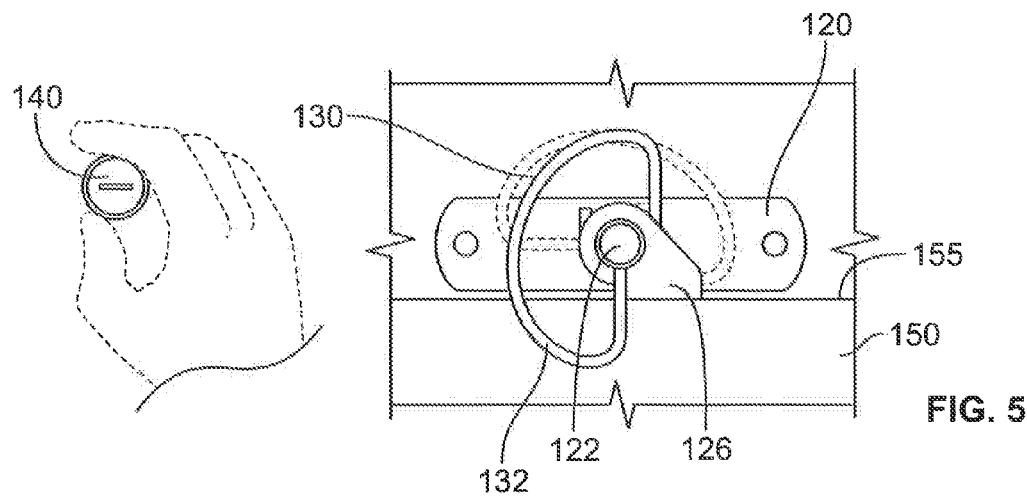
FIG. 5 is a top view of the fastener in the locking position.

Referring now also to FIG. 3, in other aspects of the present invention a rope seal 114 may be positioned between the terminus end 112 of the interior side 104 and an edge 116 of the gasket. The rope seal 114 may be made from a fiberglass rope material and rated to withstand at a predetermined temperature, such as above 1400° F. to help contain a duct fire. Higher temperature ratings may be used, such as 2100° F., to increase the safety factor.

In another embodiment of the present invention, the access panel 100 can have a octagonal profile 118 helping to reduce sharp corners when cutting the duct opening.

Referring now to FIGS. 4 through 7B, The fasteners 108 or cam locks each include a bottom plate 120 secured to the interior side 104 of the access panel. A cylinder 122 is positioned through the base plate 120 and through an aperture (not shown) in the access panel, such that a front face 124 of the cylinder 122 is accessible from the exterior side 102 of the access panel. An L shaped support flange 126 extends from an edge of the bottom plate 120 to a rear face portion 128 of the cylinder. The cylinder is rotatable with respect to the bottom plate 120 and support flange 126 and the cylinder includes a clip 130. The clip 130 has a first edge secured about the rear face portion 128 and a second edge secured about a portion of the cylinder adjacent the bottom plate 120, such that when the cylinder rotates, the clip rotates therewith. Lastly, the clip 130 includes a locking section 132 that when the cylinder is rotated, moves into engagement over the gasket such that when the access panel 100 is positioned over an opening 315 in the duct 150, the locking section 132 secures a portion 155 of the duct 150 adjacent the opening against the gasket 110. Similarly rotation of the cylinder is an opposite direction can disengage the clip.

Figure 6A:
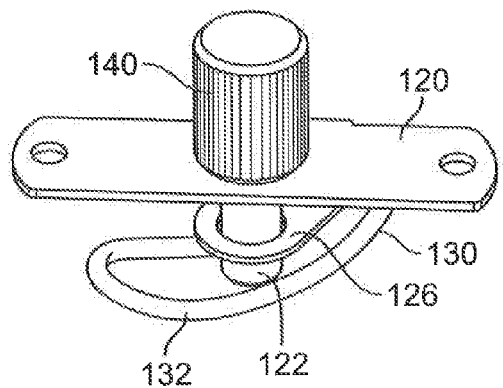
FIG. 6A is a perspective view of the fastener.

While the front face 124 of the cylinder 122 may include a key head to permit rotation of the cylinder by a key, tool, wrench, screwdriver (FIG. 7B) or similar devices, the front face 124 may also include a knurl head 140 that allows a technician to engage and disengage each clip by simply turning the knurl head and thus rotating the cylinder (FIG. 6A). This aspect would provide a tool-less access panel.

Figure 6B:
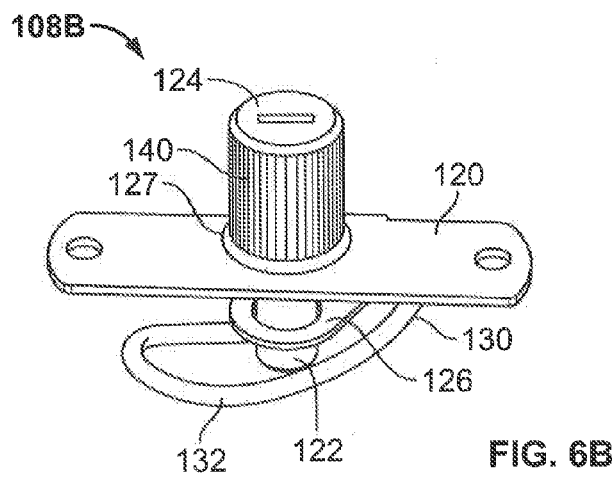
FIG. 6B is a perspective view of a fastener in accordance with another embodiment of the invention.
Figure 7A:
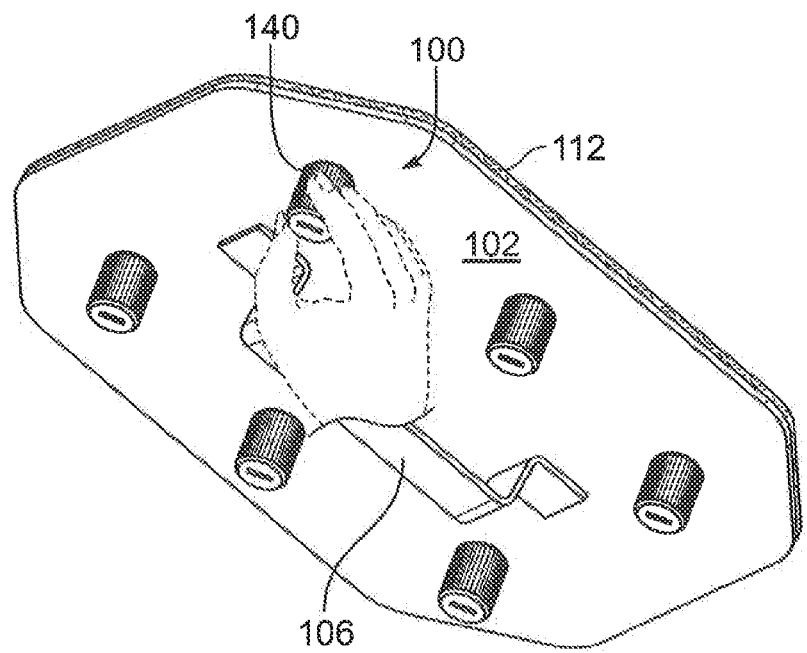
FIG. 7A is a perspective view of the access panel using knurl handles to lock the fastener.
Figure 7B:
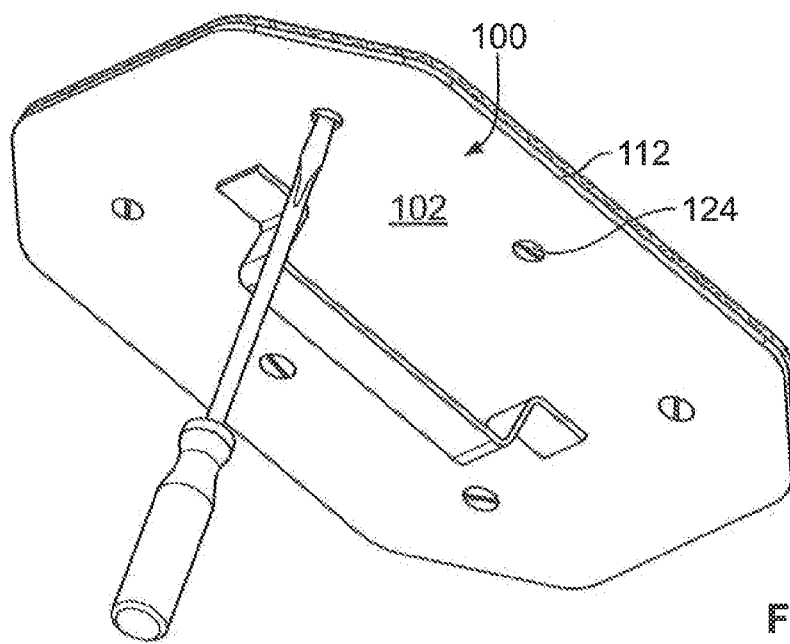
FIG. 7B is a perspective view of an access panel using a screw driver to lock the fastener.
Figure 7C:
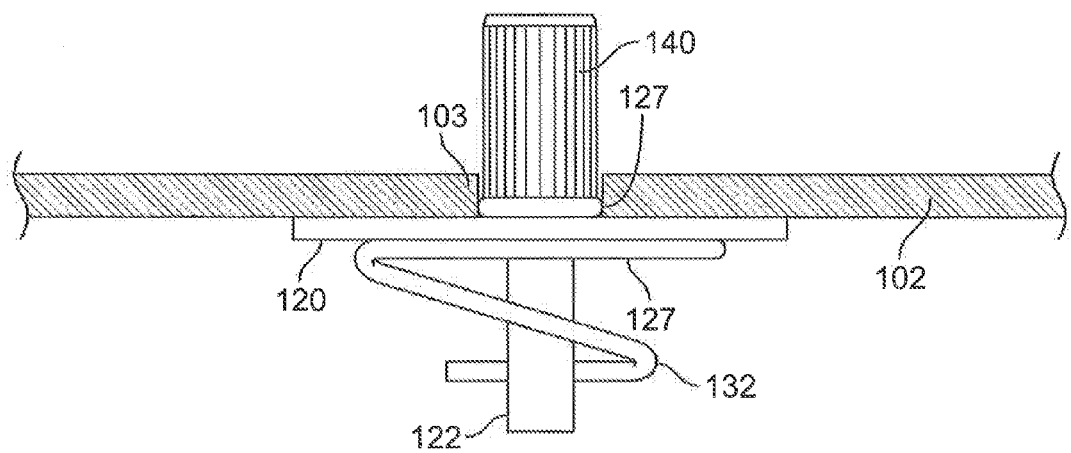
FIG. 7C is a side view of an access panel with the fastener from FIG. 6B.
Figure 7D:
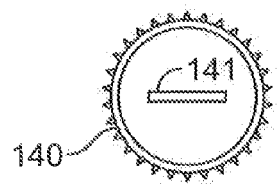
FIG. 7D is a top view of a fastener knurl handle in accordance with another embodiment of the invention.
Figure 8:
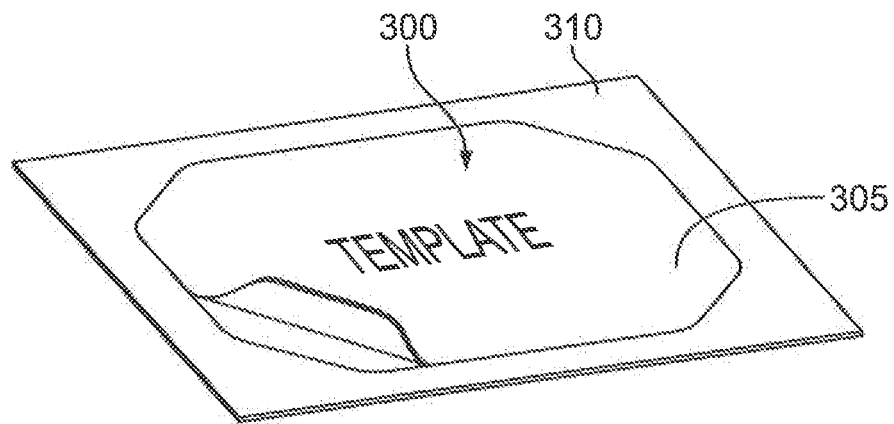
FIG. 8 is a template sticker used in a method of installing an access panel.

Referring now also to FIG. 6B and FIGS. 7C and 7D in other embodiments of the present invention there is provided a plurality of fasteners 108B or cam locks; each include a bottom plate 120 secured to the interior side 104 of the access panel. A cylinder 122 is positioned through the base plate 120 and through an opening 103 in the access panel, such that a front face 124 of the cylinder 122 is accessible from the exterior side 102 of the access panel. An L shaped support flange 126 extends from an edge of the bottom plate 120 to a rear face portion 128 of the cylinder. The cylinder is rotatable with respect to the bottom plate 120 and support flange 126 and the cylinder includes a clip 130. The clip 130 has a first edge secured about the rear face portion 128 and a second edge secured about a portion of the cylinder adjacent the bottom plate 120, such that when the cylinder rotates, the clip rotates therewith. Lastly, the clip 130 includes a locking section 132 that when the cylinder is rotated, moves into engagement over the gasket such that when the access panel 100 is positioned over an opening 315 in the duct 150, the locking section 132 secures a portion 155 of the duct 150 adjacent the opening against the gasket 110. Similarly rotation of the cylinder is an opposite direction can disengage the clip. In addition, an O-ring 127 is positioned between the bottom plate 120 and the front face, preferably between the bottom plate 120 and the knurl head 140. The O-ring 127 positions in the opening of the accesses panel to provide a fluid seal between the outside and the inside of the duct. As shown the front face 124 of the knurl head 140 may include a key head 141 to permit rotation of the cylinder by a key, tool, wrench, screwdriver or similar devices.

Figure 9:
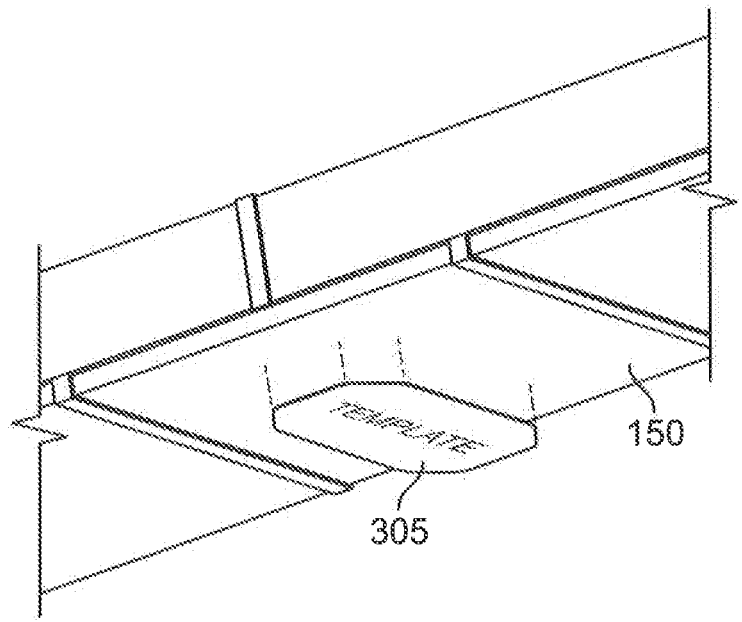
FIG. 9 is a perspective view of the template being attached to a duct system.
Figure 10:
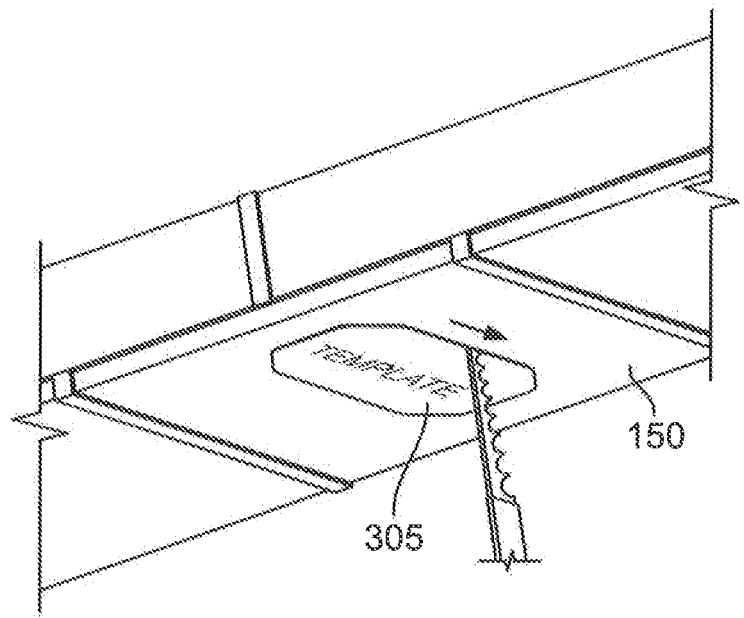
FIG. 10 is a perspective view of the template being cut out of the duct system to create an access opening.
Figure 11:
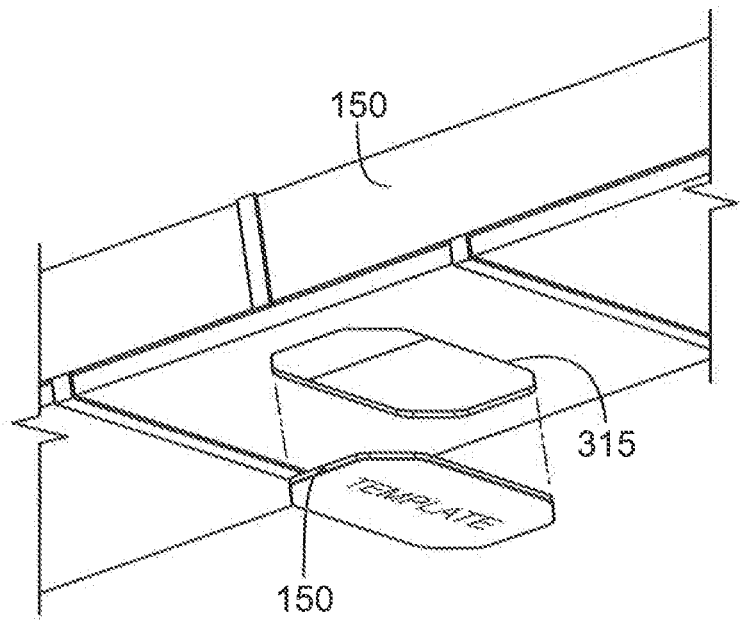
FIG. 11 is a perspective view showing the access opening as the template and portion of the duct system under the template is removed.
Figure 12:
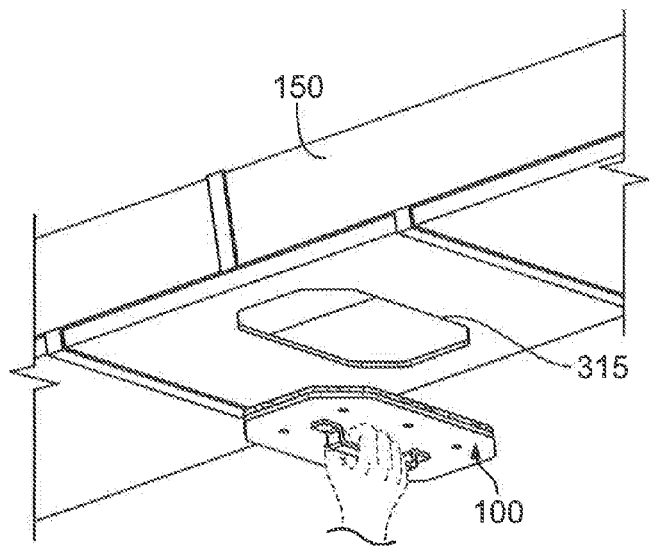
FIG. 12 is a perspective view showing an access panel being positioned over the opening.
Figure 13:
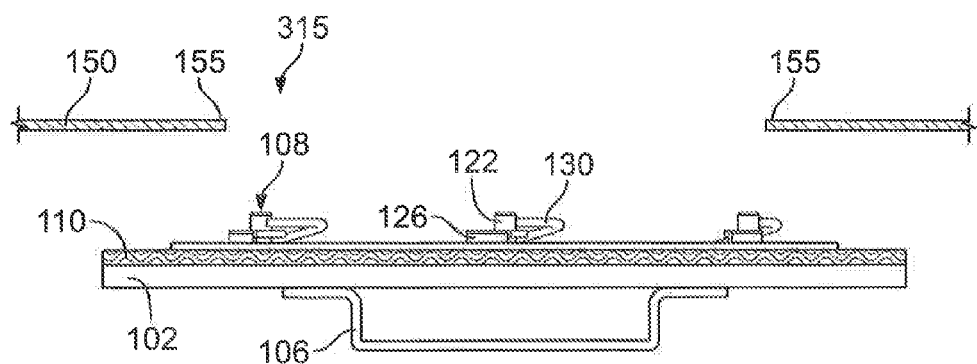
FIG. 13 is a side view of the access panel being positioned towards the opening in the duct system.
Figure 14:
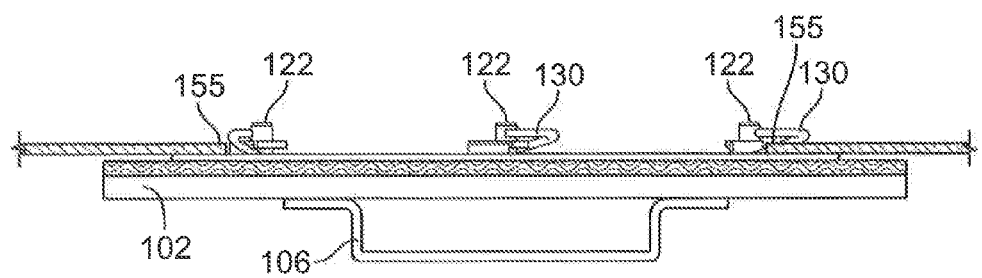
FIG. 14 is a side view of the access panel secured against the duct system covering the opening therein.

Referring now to FIGS. 8 through 14, there is shown a method of installing an access panel 100, similarly designed to one or more of the aforementioned embodiments. The method includes in a first step to apply a template outline 300 to a portion of the duct 150 that matches substantially to a profile outline 145 on the interior side 104 of the access panel 100 (FIG. 9). The template outline 300 may be a sticker 305 that can be pealed from a backing page 310 (FIG. 8) and then easily applied to a portion of the duct 150. Once affixed to the duct, the technician can cut around the sticker 305 to create an opening 315 matching or corresponding to the profile outline 145 (FIGS. 10 and 11). As noted, in one aspect, the template outline may have a polygonal shaped profile that is less inclined to have sharp corners such as an octagon or other similar shape. The technician can then position an access panel 100 over the opening 315 and position and lock the access panel against the opening 315 in the duct 150. By rotating the cylinders and thus engaging the clips against a portion of the duct adjacent the opening the access panel 100 will be locked in place.

Figure 15:
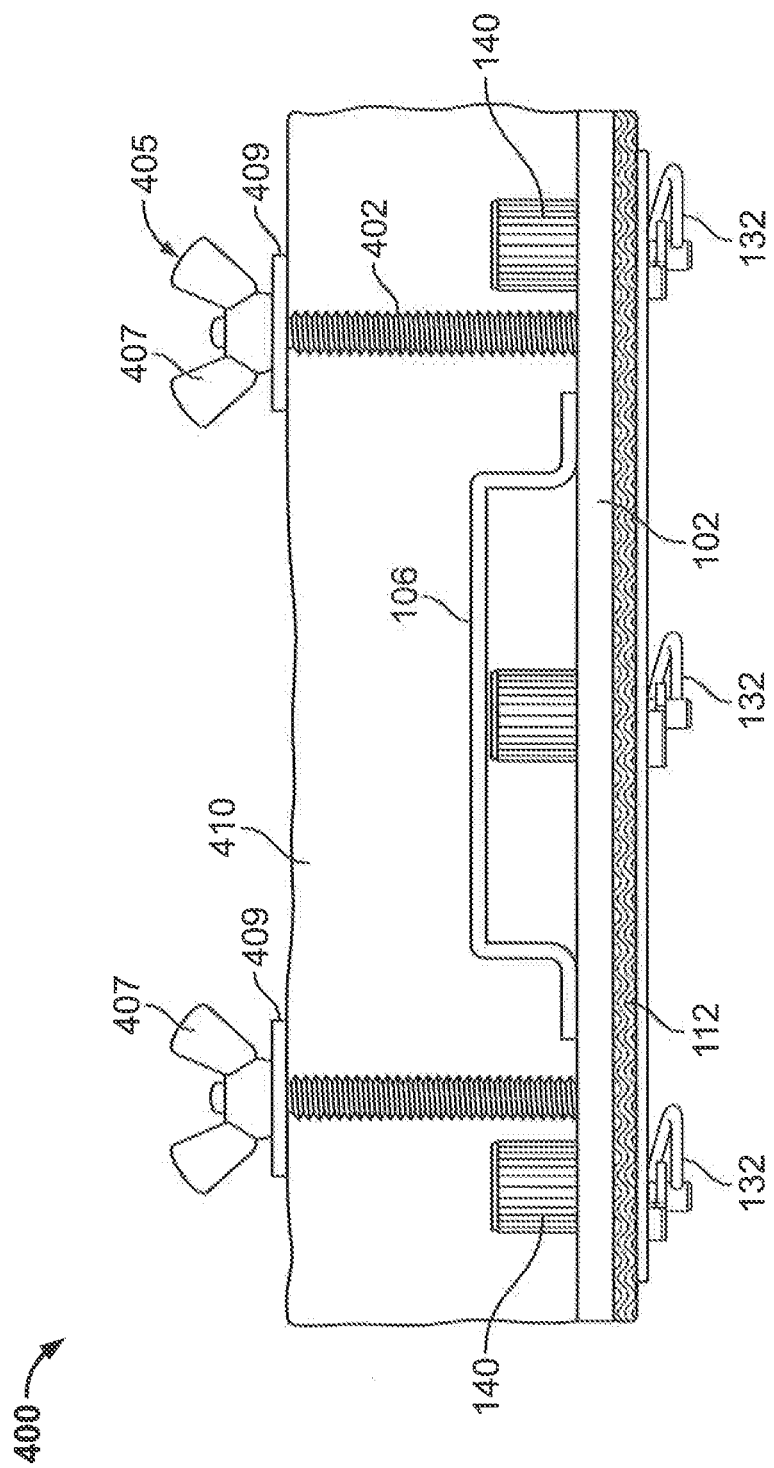
FIG. 15 is a side view of an access panel secured against the duct system having extended bolts to secure insulation on the exterior of the panel.
Figure 16:
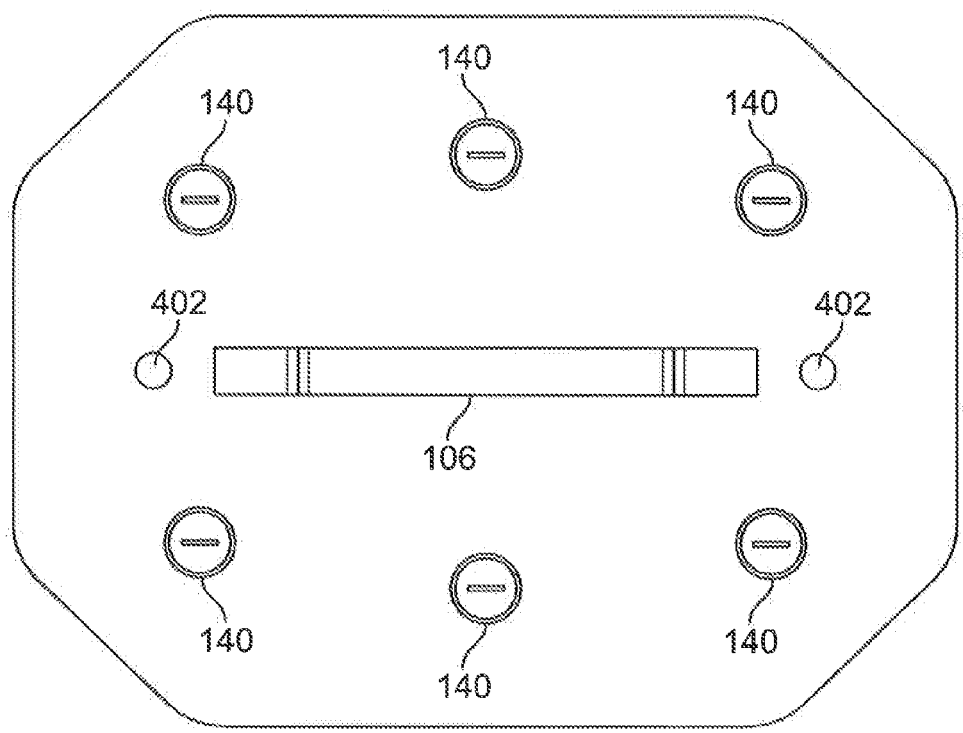
FIG. 16 is a top view of the access panel from FIG. 15.

Referring now to FIGS. 15 and 16 there is provided in another embodiment of the present invention an access panel 400 having external stud bolts 405 to permit insulation or sound deadening material 410 to be secured to the outer face 102 of the access panel 400. This is especially important with the duct system includes outer insulation. As such any insulation or material removed to create the access panel can be replaced after the access panel is secured to the duct. The stud bolts 405 may include a bolt 402, wing nut 407 and a washer 409 to help secure the insulation in place.

Figure 17:
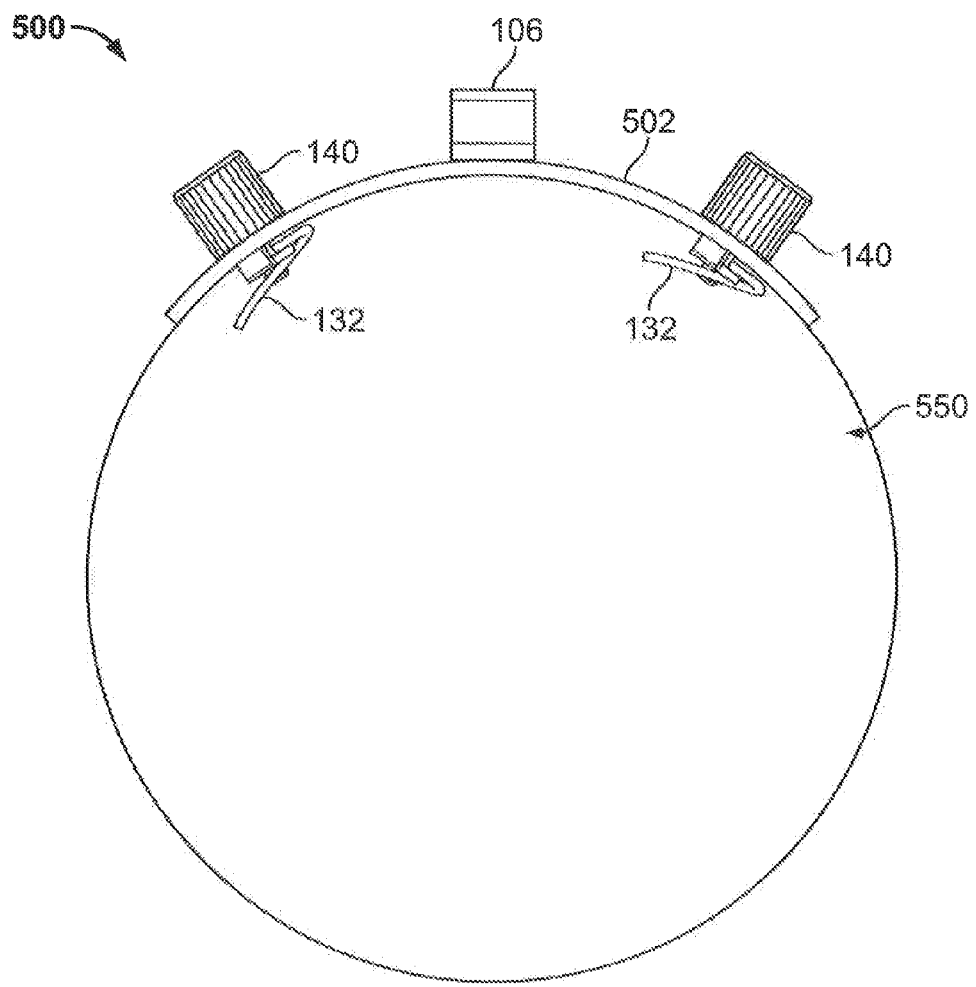
FIG. 17 is an access panel in accordance with one embodiment of the present invention providing for a curved duct system.

As illustrated in FIG. 17, it is also possible to have a curved plate 502 in an access panel 500 designed to fit onto a curved duct system 550.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred.

I claim:

1. An access panel for an opening in a duct system, the access panel comprising:
   a base plate having an exterior surface side and an interior surface side, wherein the base plate is positioned against the opening of the duct system such that the interior surface side faces towards the duct system and the exterior surface side faces away from the duct system;
   wherein the interior surface side of the base plate has defined a first interior surface section having a profile corresponding substantially to the opening in the duct system, and a second interior surface section defined between the first interior surface section and an outside edge of the base plate, such that when the base plate is positioned against the opening of the duct system the first interior surface section resides about the opening of the duct system and the second interior surface section overlaps a duct edge defined about a periphery of the opening in the duct system; and
   a plurality of rotatable fasteners separately positioned through openings in the base plate about the profile of the first interior surface section, each fastener having a locking clip extending from the fastener about the interior surface side of the first interior surface section and said locking clip being configured to move into a locking position, said locking position defined when the locking clip is rotated to extend over and engage the duct edge, and each fastener having a front face accessible from the exterior surface side of the base plate such that when the front face is rotated the locking clip rotates therewith;
   whereby when the access panel is positioned with the first interior surface section on the interior surface against the opening in the duct system and one or more of the plurality of rotatable fasteners are moved to said locking position, one or more of the locking clips rotate to extend over and engage the duct edge to secure the duct system to the base plate.

2. The access panel of claim 1 further comprising a handle secured to the exterior side.

3. The access panel of claim 1 further comprising a gasket positioned on the interior surface side of the base plate, the gasket being further positioned between a terminus end of the interior surface side and a periphery of the first interior surface section on the interior surface side.

4. The access panel of claim 3, wherein the gasket is made from a neoprene material.

5. The access panel of claim 1 further comprising:
   a rope seal positioned along a terminus end of the interior surface side of the access panel; and
   a gasket positioned against the rope seal and extending towards the periphery of the first interior surface section on the interior surface side.

6. The access panel of claim 5, wherein the rope seal is made from a fiberglass rope material and configured to withstand a predetermined temperature.

7. The access panel of claim 1, wherein the base plate has an outside profile configured as an octagonal profile.

8. The access panel of claim 1, wherein each fastener is further configured to include:
   a bottom plate secured to the interior surface side of the access panel;
   a rotatable cylinder having one end configured to the front face;
   an o-ring positioned between the front face and the bottom plate for sealing the openings in the base plate;
   a support flange extending from an edge of the bottom plate to a rear face portion defined on the cylinder; and
   the locking clip secured to the cylinder and rotatable therewith, the locking clip having a portion that is configured to move into engagement over a portion of the duct edge when the cylinder rotates,
   such that when the access panel is positioned with the first interior surface section on the interior surface against the opening in the duct system and one or more of the plurality of rotatable fasteners are moved to said locking position, one or more of the locking clips rotate to extend over and engage the duct edge to secure the base plate to access panel.

9. The access panel of claim 8, wherein the front face of each cylinder includes a key head.

10. The access panel of claim 8, wherein an end of the cylinder adjacent the front face includes a knurl head positioned between the front face and the bottom plate.

11. The access panel of claim 10, wherein the knurl head includes a key head.

12. The access panel of claim 1 further comprising at least one stud bolt connector secured to the base plate facing the exterior surface side such that the stud bolt extends away from the exterior surface side of the base plate.

13. The access panel of claim 1, wherein the base plate has a curved profile configured to accommodate a curved duct system.

14. An access panel for an opening in a duct system, the access panel comprising:
   a base plate having an exterior surface side and an interior surface side, wherein the base plate is positioned against the opening of the duct system such that the interior surface side faces towards the duct system and the exterior surface side faces away from the duct system;
   wherein the interior surface side of the base plate has defined a first interior surface section having a profile corresponding substantially to the opening in the duct system, and a second interior surface section defined between the first interior surface section and an outside edge of the base plate, such that when the base plate is positioned against the opening of the duct system the first interior surface section resides about the opening of the duct system and the second interior surface section overlaps a duct edge defined about a periphery of the opening in the duct system; and
   a plurality of rotatable fasteners separately positioned through openings in the base plate about the profile of the first interior surface section, each fastener having a locking clip extending from the fastener about the interior surface side of the first interior surface section and said locking clip being configured to move into a locking position, said locking position defined when the locking clip is rotated to extend over and engage the duct edge, and each fastener having a front face accessible from the exterior surface side of the base plate such that when the front face is rotated the locking clip rotates therewith and wherein each fastener is further configured to include: a bottom plate secured to the interior surface side of the access panel, a rotatable cylinder having one end configured to the front face, an o-ring positioned between the front face and the bottom plate for sealing the openings in the base plate, a support flange extending from an edge of the bottom plate to a rear face portion defined on the cylinder, and the locking clip secured to the cylinder and rotatable therewith, the locking clip having a portion that is configured to move into engagement over a portion of the duct edge when the cylinder rotates, such that when the access panel is positioned with the first interior surface section on the interior surface against the opening in the duct system and one or more of the plurality of rotatable fasteners are moved to said locking position, one or more of the locking clips rotate to extend over and engage the duct edge to secure the base plate to access panel;

whereby when the access panel is positioned with the first interior surface section on the interior surface against the opening in the duct system and one or more of the plurality of rotatable fasteners are moved to said locking position, one or more of the locking clips rotate to extend over and engage the duct edge to secure the duct system to the base plate.

15. The access panel of claim 13, wherein an end of the cylinder adjacent the front face includes a knurl head positioned between the front face and the bottom plate.

16. The access panel of claim 14, wherein the knurl head includes a key head.

* * * * *